United States Patent
Batten et al.

(10) Patent No.: US 10,830,618 B2
(45) Date of Patent: Nov. 10, 2020

(54) TRIGGER MANAGEMENT DEVICE FOR MEASUREMENT EQUIPMENT

(71) Applicant: DWFritz Automation, Inc., Wilsonville, OR (US)

(72) Inventors: Robert Batten, Wilsonville, OR (US); Mark Baker, Wilsonville, OR (US); Shawn Boling, Wilsonville, OR (US); John Fouts, Wilsonville, OR (US); Omar Mora, Wilsonville, OR (US); Clint Vandergiessen, Wilsonville, OR (US); Jared Greco, Wilsonville, OR (US)

(73) Assignee: DWFritz Automation, Inc., Wilsonville, OR (US)

( * ) Notice: Subject to any disclaimer, the term of this patent is extended or adjusted under 35 U.S.C. 154(b) by 0 days.

(21) Appl. No.: 16/289,430

(22) Filed: Feb. 28, 2019

(65) Prior Publication Data

US 2019/0265081 A1     Aug. 29, 2019

Related U.S. Application Data

(60) Provisional application No. 62/636,739, filed on Feb. 28, 2018.

(51) Int. Cl.
    *G01D 11/02*        (2006.01)
    *G01B 3/1041*       (2020.01)
    (Continued)

(52) U.S. Cl.
    CPC .......... *G01D 11/02* (2013.01); *G01B 3/1041* (2013.01); *G01B 5/0002* (2013.01);
    (Continued)

(58) Field of Classification Search
    CPC ....................................................... G01D 11/02
    (Continued)

(56) References Cited

U.S. PATENT DOCUMENTS 3,537,075 A * 10/1970 Anderson ........ G11B 20/10212
                                                360/51
5,007,006 A * 4/1991 Taylor .................. G01B 11/005
                                               356/498

(Continued)

FOREIGN PATENT DOCUMENTS

| JP | 10-185972 | 1/1998 |
|----|-----------|--------|
| JP | 2722384 | 3/1998 |
| JP | 2722384 B2 * | 3/1998 |

OTHER PUBLICATIONS

Translation of JP-2722384-B2 (Year: 1998).*

*Primary Examiner* — Nathaniel T Woodward
(74) *Attorney, Agent, or Firm* — Schwabe, Williamson & Wyatt, P.C.

(57) ABSTRACT

Apparatuses, systems and methods associated with a trigger management device for managing triggering of sensors within measurement equipment are disclosed herein. In embodiments, a trigger management device may include trigger circuitry coupled to a sensor, the trigger circuitry to determine an amount of delay from trigger transmission to data capture for the sensor, and transmit a trigger to the sensor, the trigger to cause the sensor to capture sensor data. The trigger management device may further include encoder circuitry coupled to one or more encoders, the one or more encoders to indicate positions of one or more actuators or motors, the encoder circuitry to capture encoder data from the one or more encoders at a time that is the amount of delay after transmission of the trigger, wherein the encoder data indicates current positions of the one or more actuators or motors. Other embodiments may include circuitry to (Continued)

manage and/or transmit encoder and other data to multiple devices.

20 Claims, 6 Drawing Sheets

(51) Int. Cl.
G01B 5/00 (2006.01)
G01B 9/08 (2006.01)
G01B 11/00 (2006.01)
G01B 3/1048 (2020.01)

(52) U.S. Cl.
CPC .......... *G01B 5/0007* (2013.01); *G01B 5/0009* (2013.01); *G01B 9/08* (2013.01); *G01B 11/005* (2013.01); *G01B 3/1048* (2020.01)

(58) Field of Classification Search
USPC ........................................................ 73/865.8
See application file for complete search history.

(56) References Cited

U.S. PATENT DOCUMENTS

| | | | |
|---|---|---|---|
| 5,513,115 A * | 4/1996 | Richards | B29C 45/76 264/40.5 |
| 7,199,385 B2 * | 4/2007 | Wehrle | G01B 11/04 250/559.19 |
| 9,266,376 B1 * | 2/2016 | Mah | H04N 5/232 |
| 2002/0177974 A1 * | 11/2002 | Ting | G01C 15/002 702/150 |
| 2003/0038645 A1 | 2/2003 | Ishii | |
| 2007/0010898 A1 * | 1/2007 | Hosek | G05B 19/4148 700/2 |
| 2010/0149525 A1 * | 6/2010 | Lau | G01B 11/002 356/139.03 |
| 2013/0300838 A1 * | 11/2013 | Borowski | G01S 7/486 348/46 |
| 2016/0362840 A1 * | 12/2016 | Figiel | D21G 9/0045 |
| 2017/0106885 A1 * | 4/2017 | Singh | B61L 23/044 |
| 2017/0134619 A1 * | 5/2017 | Narayanswamy | H04N 5/0733 |
| 2017/0289430 A1 * | 10/2017 | Seki | H04N 5/2254 |

* cited by examiner

TRIGGER MANAGEMENT DEVICE FOR MEASUREMENT EQUIPMENT

RELATED APPLICATIONS

The present application claims priority to U.S. Provisional Patent Application No. 62/636,739, filed Feb. 28, 2018, entitled "METHOD AND APPARATUS FOR HIGH SPEED, NON-CONTACT COORDINATE MEASURING", the entire disclosure of which is hereby incorporated by reference.

TECHNICAL FIELD

The present disclosure relates to the field of measurement systems. More particularly, the present disclosure relates to a trigger management device for managing triggering of sensors within measurement systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Legacy measurement equipment often requires static positioning of sensors and a part being measured, and contact to be made with the part to achieve accurate measurements and/or determination of positions on the part to which the measurements corresponded. While this approach often achieves accurate measurements and/or determination of the positions, the time needed to perform measurements of the part could be lengthy, with some implementations allowing for a maximum of 10 parts being inspected in one day. To address the lengthy time to perform measurements, some legacy equipment evolved to perform measurements while the sensors and/or the part were moving, or attempted to minimize the amount of time that the sensors and the part were static. However, performing measurements while the sensors and/or the part is moving, or minimizing the amount of time the sensors are static often introduces inaccuracies in the measurements and/or determination of the positions. The inaccuracies could be critical in measurements of parts that require accurate measurements.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
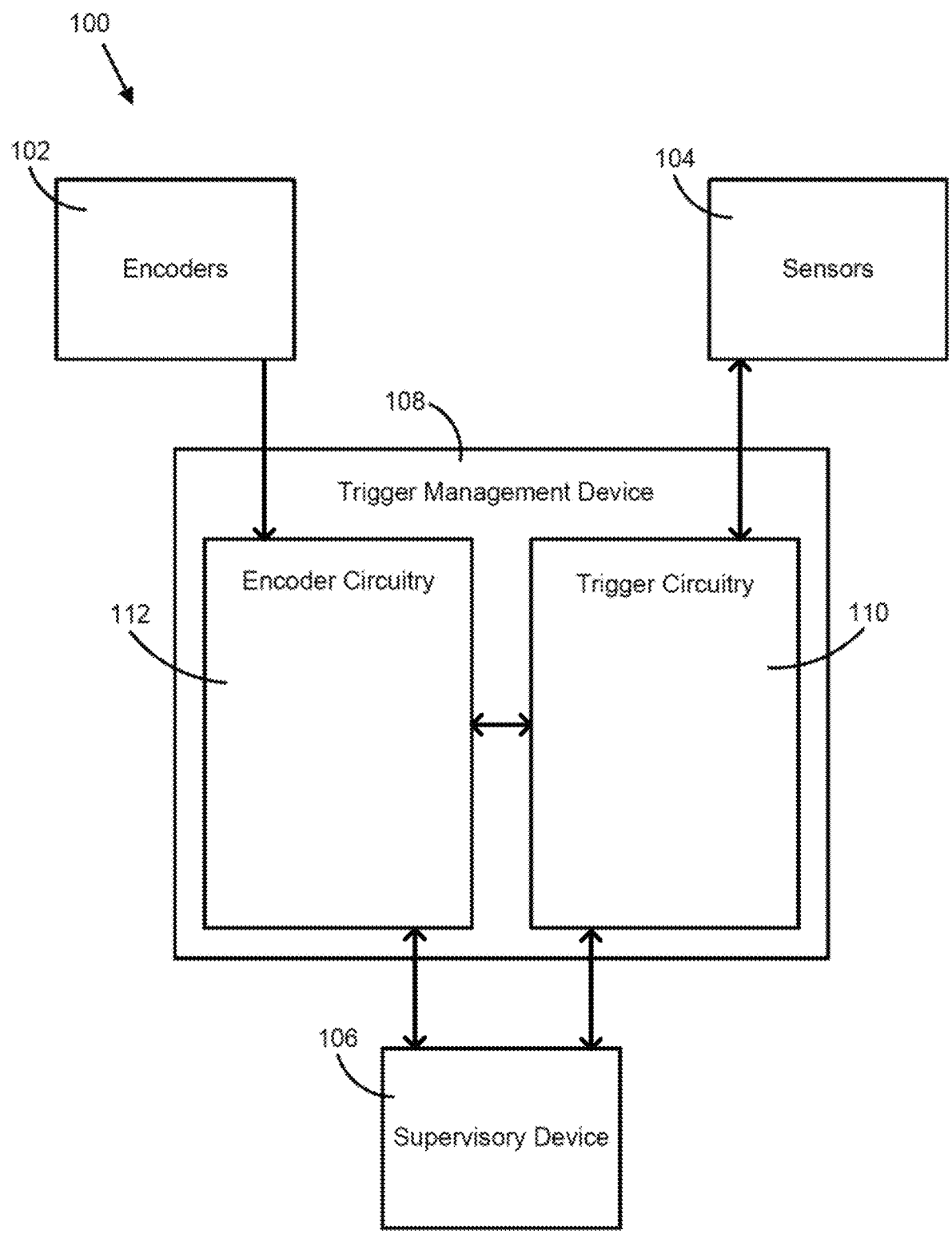
FIG. 1 illustrates a block diagram of an example trigger management device arrangement, according to various embodiments.

Apparatuses, systems and methods associated with a trigger management device for managing triggering of sensors within measurement equipment are disclosed herein. In embodiments, a trigger management device may include trigger circuitry coupled to a sensor, the trigger circuitry to determine an amount of delay from trigger transmission to data capture for the sensor, and transmit a trigger to the sensor, the trigger to cause the sensor to capture sensor data. The trigger management device may further include encoder circuitry coupled to one or more encoders, the one or more encoders to indicate positions of one or more motors, the encoder circuitry to capture encoder data from the one or more encoders at a time that is the amount of delay after transmission of the trigger, wherein the encoder data indicates current positions of the one or more motors.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

FIG. 1 illustrates a block diagram of an example trigger management device arrangement 100, according to various embodiments. The trigger management device arrangement 100 may include one or more encoders 102. The encoders 102 may be coupled to motors and may provide outputs that indicate states of the motors. For example, the outputs of the encoders 102 may indicate the positions of the motors, an amount of movement of the motors, or some combination thereof. In some embodiments, an encoder 102 may output a pulse every time a motor coupled to the encoder 102 is actuated by a predefined distance or may output an indication of a current position of the motor coupled to the encoder 102. Further, the encoders 102 may output a sine equation or a cosine equation that indicates the positions of the motors. As used herein, the term "motor" and "actuator" may refer to an actuator of any sort, motor, solenoid, or any other suitable device that allows an attached device (such as a sensor) to be physically moved. Some examples may include conventional rotary motors, linear motors, servos, gear-drive motors, stepper motors, pneumatic motors, hydraulic motors, solenoids, and/or any other device for imparting movement upon an attached device, as may be suitable to a given embodiment.

The trigger management device arrangement 100 may further include one or more sensors 104. The sensors 104 may capture sensor data in response to receiving triggers and may output the captured sensor data. The sensors 112 may include white light interferometry sensors, chromatic confocal sensors, stereo line scan sensors, laser triangulation sensors, white light confocal sensors, vision sensors, infrared sensors, x-ray sensors, point laser sensors, line scan laser sensors (including a DWFritz Laser Module, a proprietary laser sensor adapted for high-precision touchless metrology applications), white light sensors, interferometer sensors (i.e., distance sensors, fringe map sensors, and/or surface roughness sensors), video sensors, camera sensors, confocal sensors, color sensors, adhesion sensors, humidity sensors, temperature sensors, surface finish sensors, capacitance sensors, touch probe sensors, all seeing eye sensors, air gauge sensors, ultrasonic sensors, imaging sensors, deep learning sensors, or some combination thereof.

The trigger management device arrangement 100 may further include one or more supervisory devices 106. The supervisory devices 106 may control operation of one or more of the elements of the trigger management device arrangement 100 and/or may collect data from one or more of the elements of the trigger management device arrangement 100. For example, the supervisory device 106 may retrieve and compile data from the encoders 102 and/or the sensors 104. Further, the supervisory device 106 may define a triggering scheme for triggering the sensors 104 to capture sensor data.

The trigger management device arrangement 100 may further include a trigger management device 108. The trigger management device 108 may comprise an electrical device that couples to the encoders 102, the sensors 104, and the supervisory device 106. For example, the trigger management device 108 may comprise a circuit board within one or more electrical components mounted to the circuit board and the circuit board may be located within an enclosure (such as a box) in some embodiments.

In embodiments, one or more components of trigger management device arrangement 100, including supervisory device 106, trigger management device 108, trigger circuitry 110, and encoder circuitry 112 (among other components), may be implemented using a variety of hardware and/or software. For example, hardware implementations may use a field-programmable gate array (FPGA), application-specific integrated circuit (ASIC), general purpose processor, such as an ARM, Intel, AMD, or other suitable microprocessor, or a combination of any of the foregoing. Other example implementations may use a general purpose processor (such as an ARM processor) or microcontroller (such as an Atmel or similar processor) in combination with software. Still other examples may use a combination of any of the foregoing.

The trigger management device 108 may include trigger circuitry 110. Trigger management device 108 and/or trigger circuitry 110 may handle any mathematical computations required to determine the location of each sensor 104, when to transmit a trigger, when to read from each sensor 104, and other such functions involved with obtaining measurements from each sensor 104. The trigger circuitry 110 may be coupled to the sensors 104 and the supervisory device 106. The trigger circuitry 110 may generate one or more triggers for the sensors 104 and may transmit the triggers to the sensors 104 to cause the sensors 104 to capture sensor data. For example, the trigger circuitry 110 may receive the triggering scheme from the supervisory device 106. The trigger circuitry 110 may analyze the triggering scheme and generate the triggers for the sensors 104 based on the triggering scheme. For example, the trigger circuitry 110 may analyze the triggering scheme and determine that one or more of the sensors 104 should be triggered at certain times, at certain temporal intervals, at certain encoder values, at certain intervals of encoder values, at certain sensor locations, or some combination thereof. Further, the trigger circuitry 110 may identify one or more equations within the triggering scheme and determine that one or more of the sensors 104 should be triggered each time the equations equal a particular value, such as zero. The equations may include variables based on the encoder values, temporal values, or some combination thereof.

Known measuring systems, particularly systems that employ contact-style sensors, may slow or stop a sensor prior to taking a measurement of an object. The time required to completely measure a given object can be decreased (e.g. the object can be measured in less time) if sensor 104 can be kept in motion, particularly where touchless or zero-contact sensors can be employed.

In one possible embodiment, trigger circuitry 110 determines an amount of delay time between a time that a trigger is transmitted to a sensor 104 and a time that the sensor 104 begins capturing sensor data. Such an approach can allow for de-skewing of measurements. When a trigger is transmitted to a sensor 104, there may be, depending upon the nature of a given sensor 104 and the particulars of a given implementation, a delay between the trigger being sent and the measurement being captured. If the sensor 104 is moving when triggered (e.g. to save time by not stopping sensor 104 to capture every measurement), then the actual measurement may be captured at a location that differs from the encoder-indicated position at the time the trigger is transmitted. Thus error, known as skew, will limit measurement accuracy. Skew may be compensated for by knowing the delay between transmitting a trigger and actual measurement. Combined with knowing the speed of the sensor 104 in one or more given axes or dimensions (using a single dimension movement for ease of explanation here), trigger circuitry 110 can transmit the trigger when an associated encoder 102 indicates the sensor 104 is positioned some distance prior to the intended measurement point. This distance will depend upon the speed of sensor 104; a faster speed and/or longer delay will require transmitting a trigger at an increasingly advanced time. Such an approach, determining the delay in terms of an encoder or distance offset, may be useful where measurements must be made at specific points or locations around an object. In such embodiments, the measurements must be made when the encoder or encoders associated with sensor 104 indicate a particular location; using an offset or delay in terms of encoder location thus results in the value of sensor 104 being measured when the associated encoder(s) indicate(s) the desired location. In some such embodiments, the encoder value may be read to confirm correct placement.

In other embodiments, trigger circuitry 110 determines a delay time between the sending of a trigger and reading data from an encoder. Such embodiments may be useful when a series of samples are to be taken of an object without need for each measurement to be taken at a specific location. In such embodiments, a trigger is sent, followed by the predetermined delay. Once the predetermined delay elapses, both sensor 104 and its associated encoder(s) are read. The encoder value thus indicates the actual location of sensor 104's reading. For example, where an object feature such as a ridge, curve, surface, edge, or other two or three dimensional feature is to be measured at a predetermined rate, e.g. sampling every millisecond or another suitable value, a series of triggers may be sent at the sampling rate (e.g. every millisecond). Trigger circuitry 110 then reads the sensor 104 and associated encoder(s) following the predetermined delay, at the predetermined rate. The resulting measurements provide an accurate location for each measurement.

The trigger circuitry 110 may implement an initialization procedure to determine the amount of delay time. In some embodiments, the initialization procedure may include transmitting a trigger to a sensor 104, detecting an indication from the sensor 104 that indicates a start of the capture of sensor data by the sensor 104, and determining a delay time between the transmitting of the trigger and the indication. In some embodiments, the initialization procedure may involve a specific set of calibrating movements and a target in a known position and/or with known dimensions. The speed of a given sensor 104 may be readily determined by reading an associated encoder 102 at specific intervals, combined with a knowledge of the travel path of sensor 104. In other embodiments where the sensor can be translated at a constant pace, the trigger circuitry 110 may transmit a trigger to the sensor 104 that is being translated at the constant pace, determine a location of the sensor when the trigger was transmitted (as may be determined through communication with encoder circuitry), determine a position of the sensor 104 when the sensor data is captured (such as by the captured sensor data indicating a position of the sensor 104), and determine a delay time between the transmitting of the trigger and capture based on the distance traveled by the sensor 104 at the constant pace. In embodiments, the target may be affixed to a base or other known reference datum of a metrology instrument implementing the embodiment.

When a sensor 104 is moving simultaneously in multiple dimensions, matrix math techniques (e.g. multiple vectors) may be used to combine measured movements, possibly via at least one encoder 102 for each dimension, to calculate the actual path of sensor 104 through space. In some embodiments, a linear equation may be used for each axis to determine position along a given axis, with the results of the various equations reconciled using a matrix math technique. As discussed above, a sine or cosine math may also be used; in some implementations, such an approach may be necessary when dealing with movements across complicated and/or multi-dimensional surfaces or volumes. The selection of a given mathematical technique to determine sensor position will depend upon the specific requirements and/or design capabilities of a given embodiment.

Further, in embodiments where the measured object moves, in addition to the movements of sensor 104, errors imposed by movement of the object may need to be mitigated. Objects with varying weight may cause measurable differences in positioning when moved. The platen upon which the object rests may be equipped with load cells or other measurement devices (essentially a form of encoder) to capture the effect of differing object mass on the platen movement, and thus allow adjustments of the platen position and/or may be factored into the position calculations of sensor 104.

A given embodiment may employ a plurality of sensors 104. Depending upon the configuration of the embodiment, the plurality of sensors 104 may be employed sequentially, with each sensor 104 being moved over the object to be measured serially. In such an approach, each sensor 104 may follow the same or a different path depending upon the aspects of the object to be measured. The plurality of sensors 104 may also be employed in parallel, with each sensor 104 being operated and sensing simultaneously, such as where a common point or points on the object are to be measured by each sensor 104. Still other embodiments may use a combination of serial and parallel approaches, with a subset of sensors 104 being employed sequentially, and another subset being employed in parallel. Multiple sensors 104 of the same or a similar type may be employed, in parallel in some embodiments, to rapidly generate a point cloud of measurements over the object.

The trigger management device 108 may further include encoder circuitry 112. The encoder circuitry 112 may be coupled to the encoders 102 and the supervisory device 106. The encoder circuitry 112 may capture encoder data from the encoders 102. In particular, the encoder circuitry 112 may capture encoder data from the encoders 102 at certain times, where the encoder data may indicate the state of the motors coupled to the encoders 102 at the certain time. The encoder circuitry 112 may store the captured encoder data and/or transmit the captured encoder data to the supervisory device 106. The encoder circuitry 112 may format the captured encoder data for storage and/or transmission to the supervisory device 106.

The encoder circuitry 112 may take the delay time into account when capturing the encoder data and/or the trigger circuitry 110 may take the delay time into account when transmitting the triggers. In particular, determining values of the encoder data to determine positions of the sensors 104 when the sensor data is captured by the sensors 104 may be preferred. Legacy systems where the encoder data is captured at the same time the trigger is transmitted may result in inaccurate determination of the position of the sensors 104 as the delay time between transmission of the trigger and capturing of the sensor data is not taken into account. Accordingly, the legacy systems may indicate an inaccurate position of the sensors 104 based on the captured encoder data, especially when the sensors 104 are moving. The trigger management device 108 may ensure that the capturing of the encoder data and the capturing of the sensor data occur at approximately the same time (e.g., within 1 microsecond in embodiments).

In particular, the encoder circuitry 112 and the trigger circuitry 110 may operate cooperatively to transmit the trigger to each of the sensors 104 at the delay time corresponding to the sensor 104 prior to the encoder data being captured. For example, the trigger circuitry 110 may transmit the trigger to a sensor 104 at a first time. The encoder circuitry 112 may then capture the encoder data at a second time, where the second time is after the first time by the amount of delay time correspond to the sensor 104. Accordingly, the sensor 104 should be capturing the sensor data at approximately (e.g., within 1 microsecond) the same time as the encoder circuitry 112 is capturing the encoder data. Where there are multiple sensors 104, the trigger circuitry 110 may determine delay times corresponding to each of the sensors 104 and may take into account the delay times when triggering each of the sensors 104 and/or the encoder circuitry 112 may take into account the delay times when capturing the encoder data.

In some embodiments, the triggering scheme may further include indications of translation specifics of the sensors 104. For example, the triggering scheme may include indications of directions in which the sensors 104 are to be translated, velocities at which the sensors 104 are to be translated, actuation speeds of motors that cause the sensors 104 to be translated, paths along which each of the sensors 104 are to be translated, or some combination thereof. The encoder circuitry 112 may take the translation specifics into account when capturing the encoder data and/or the trigger circuitry 110 may take the translation specifics into account when transmitting the triggers. For example, in embodiments where the trigger circuitry 110 determines that the sensors 104 should be triggered at certain encoder values and/or certain sensor locations based on the triggering scheme, the trigger circuitry 110 may operate cooperatively with the encoder circuitry 112 to determine when the encoder values and/or the sensor locations are predicted to be equal to the certain encoder values and/or certain sensor locations, respectively. In particular, the encoder circuitry 112 may capture the encoder values at a certain time and provide the encoder values to the trigger circuitry 110. The trigger circuitry 110 may determine when the encoder values and/or the sensor locations are predicted to be equal to the certain encoder values and/or the sensor locations based on the encoder values provided by the encoder circuitry 112 and the translation specifics. The trigger circuitry 110 may transmit the triggers to the sensors at the delay times prior the time when the encoder values and/or the sensor locations are predicted to be equal to the certain encoder values and/or the sensor locations. The encoder 102 may capture encoder data at the delay times after the transmission of the triggers, which would be at the time that the encoder values and/or the sensor locations are predicted to be equal to the certain encoder values and/or the sensor locations.

Figure 2:
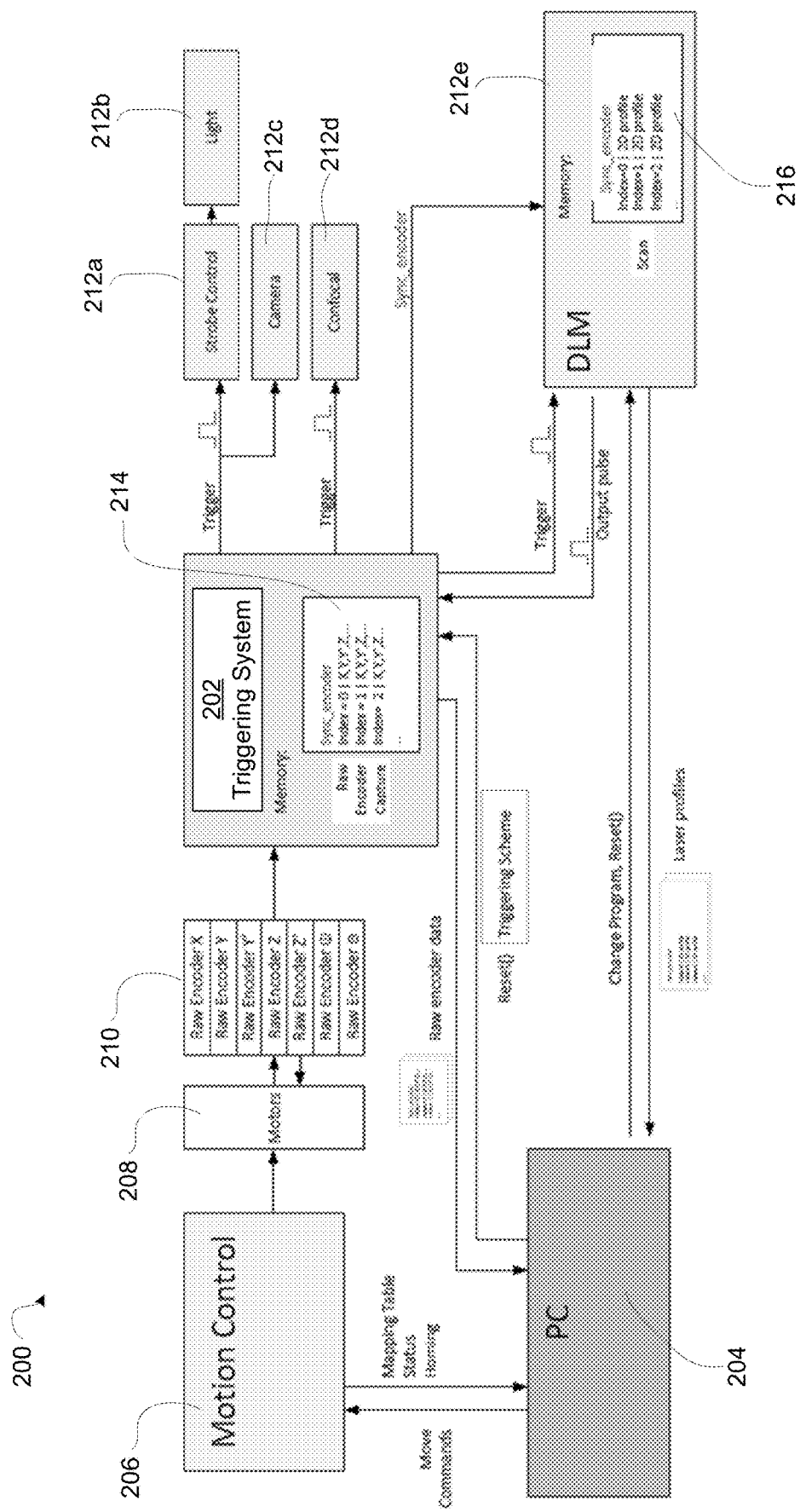
FIG. 2 illustrates a block diagram of an example system that implements a trigger management device, according to various embodiments.

FIG. 2 illustrates a block diagram of an example system 200 that implements a trigger management device, specifically, triggering system 202, according to various embodiments. In some embodiments, the system 200 may comprise, or may be implemented within a measurement assembly, where the measurement assembly may be utilized for performing measurements of a part. In particular, the system 200 may measure one or more features of a part, such as the size of the part, the shape of the part, recesses formed within the part, apertures formed within the part, or some combination thereof.

The system 200 may include a supervisory device 204. The supervisory device 204 may include one or more of the features of the supervisory device 106 (FIG. 1). The supervisory device 204 may control portions of the system 200 and/or may collect data from portions of the system. For example, the supervisory device 204 may define a methodology for performance of measurement of the part, including movement of the part, movement of sensors of the system 200, defining a triggering scheme for the sensors of the system 200, or some combination thereof. Supervisory device 204 additionally may handle functions such as external communications with both other components of a metrology system and/or other external systems (e.g. data servers, remote servers, user terminals, other manufacturing/test equipment, etc.). Supervisory device 204 may also or alternatively handle some high-level calculations, such as establishing whether to sample a feature on an object being measured at regular intervals, measure specific and specified points on the object, and/or other measurement strategies. In some embodiments, the supervisory device 204 may comprise a computer device (or a portion thereof, such as a central processing unit (CPU)), a programmable logic circuit (PLC) which may include a PC such as a laptop, desktop, server, or the like, field-programmable gate array (FPGA), application-specific integrated circuit (ASIC), or some combination thereof.

In embodiments, one or more components of system 200 may be implemented with a computer device, a programmable logic circuit (PLC), field-programmable gate array (FPGA), application-specific integrated circuit (ASIC), or some combination thereof, using software, or a combination of hardware or software. Use of software and/or flexible devices such as a PLC or FPGA may allow in-field reconfiguration of various triggering parameters, such as queues, positional determination, delays or timing offsets, sampling rates (if supported by a given sensor 212), and any other factor relevant for a given embodiment.

The system 200 may further include one or more motion control devices 206. The motion control devices 206 may be coupled to the supervisory device 204. The motion control devices 206 may receive movement commands for one or more motors of the system 200 from the supervisory device 204. The movement commands may include discrete instructions for movement of the motors (such as the direction, amount of actuation, and/or speed of actuation of the motors), component-based instructions for movement (such as the direction, amount of actuation, and/or speed of actuation of a component moved by one or more of the motors), test-based instructions for movement (such as providing a test to be performed on a part being measured by the system 200, where implementation of the test includes actuation of the motors), or some combination thereof. The motion control devices 206 may receive the movement commands and may convert the movement commands into signals that cause actuation of motors of the system 200.

The motion control devices 206 may further provide information regarding actuation of the motors to the supervisory device 204. For example, the motion control devices 206 may provide mapping tables, motor statuses, homing data, or some combination thereof.

The system 200 may further include one or more motors 208. The motors 208 may be coupled to the motion control devices 206 and may receive signals from the motion control devices 206 that cause the motors 208 to actuate. The motors 208 may be coupled to movable components of the measurement assembly. The motors 208 may cause the movable components to be translated based on the signals received from the motion control devices 206. For example, one of the motors 208 may be coupled to a platform of the measurement assembly on which a part is positioned and another of the motors 208 may be coupled to a sensor apparatus in some embodiments. The motors 208 may cause the platform and the sensor to move in concert or synchronization to effect the measurement of the part.

The system 200 may further include one or more encoders 210. For example, the system 200 includes seven encoders 210 in the illustrated embodiment. The number of encoders 210 in a given embodiment may depend upon the needs of a given implementation, and the particular function of a given motor 208 in the operation of system 200. In some embodiments, there may be at least one encoder for each motor. In other embodiments, one or more motors may be equipped to plurality of encoders. The encoders 102 may include one or more features of the encoders 102 (FIG. 1). The encoders 210 may be coupled to the motors 208, the movable components of the measurement assembly, or some combination thereof. The encoders 210 may detect positions of the motors 208, an amount of movement of the motors 208, positions of the movable components, an amount of movement of the movable components, or some combination thereof. The encoders 210 may indicate a position of the motors 208. For example, the encoders 210 may output a pulse every time the motors 208 are actuated by a predefined distance, may output an indication of a current position of the motors 208, or some combination thereof.

In some embodiments, the encoders 210 are coupled to triggering system 202 via a quadrature interface, although any other interface type that can reliably convey information from encoders 210 to triggering system 202 may be employed. Encoders may be captured or otherwise monitored at a given sampling frequency. In embodiments, a given encoder 210 may output some degree of glitching or jittering as its associated sensor 212 moves. This glitching or jitter may be minimized or removed by introducing a blanking interval between each reading of encoder 210 to allow each new encoder 210 measurement to settle.

The system 200 may further include the triggering system 202. The triggering system 202 may include one or more of the features of the trigger management device 102 (FIG. 1). The triggering system 202 may be coupled to the encoders 210, the supervisory device 204, or some combination thereof. The triggering system 202 may receive the indications of the positions of the motors 208 from the encoders 210. Further, the triggering system 202 may provide the indications of the positions of the motors 208 to the supervisory device 204 and receive a triggering scheme from the supervisory device 204. The trigger management device 204 may utilize the indications of the positions and/or the triggering scheme to trigger one or more sensors.

The system 200 may further include one or more sensors 212. For example, the sensors 212 includes a strobe control 212a, a light 212b, a camera 212c, a confocal sensor 212d and a laser module sensor 212e (which may be, in some embodiments, a "smart" sensor such as a DWFritz Laser Module™) in the illustrated embodiment. The sensors 212 may further include white light interferometry sensors, chromatic confocal sensors, stereo line scan sensors, laser triangulation sensors, white light confocal sensors, vision sensors, infrared sensors, x-ray sensors, point laser sensors, line scan laser sensors, laser sensors, white light sensors, interferometer sensors (i.e., distance sensors, fringe map sensors, and/or surface roughness sensors), video sensors, camera sensors, confocal sensors, color sensors, adhesion sensors, humidity sensors, temperature sensors, surface finish sensors, capacitance sensors, touch probe sensors, an "all seeing eye sensor" (such as a DWFritz Integrated Sensor, or DIS sensor), one dimension, two dimension, or three dimension sensing optical sensors, air gauge sensors, ultrasonic sensors, imaging sensors, deep learning sensors, or some combination thereof in other embodiments. The sensors 212 may include one or more of the features of the sensors 104 (FIG. 1). The sensors 212 may be mounted to the measurement assembly. The sensors 212, or some portion thereof, may be directed toward the part to be measured by the measurement assembly.

The sensors 212 may be coupled to the triggering system 202, the supervisory device 204, or some combination thereof. The sensors 212 may receive triggers from the triggering system 202, where the triggers cause the sensors 212 to capture sensor data. For example, the triggering system 202 may transmit a signal to one of the sensors 212 that causes the sensor 212 to trigger on the rising edge of the signal, the falling edge of the signal, or some combination thereof. Further, the sensors 212, or some portion thereof, may receive program change indications from the supervisory device 204. The sensors 212 may provide sensor data detected by the sensors 212 to the supervisory device 204. In some embodiments, the sensors 212 may provide an indication (such as a pulse) that a sensor has completed and/or initiated sensor data capture.

The triggering system 202 may provide triggers to the sensors 212 that cause the sensors 212 to capture sensor data based on one or more characteristics. For example, the triggering system 202 may utilize time-based triggering (triggering at certain intervals), event-based triggering (triggering in response to certain events), equation-based triggering (triggering based on conditions of an equation being satisfied), vector-based triggering (triggering based on a certain distance of actuation of a motor 208 or a position of a sensor 212), input-based triggering (triggering based on an external input), encoder-based triggering (triggering based on encoder data received from the encoders 210), or some combination thereof, for providing triggers to the sensors 212.

As with other components of system 200, the triggering system 202 may be implemented using in various ways depending upon the needs of a given implementation. Possible embodiments may implement triggering system 202 using an FPGA, an ASIC, various components of a computing system, in software, or some combination of any of the foregoing.

Vector-based triggering typically is based upon a given direction or distance from two points. For example, two points in space around an object to be tested may be provided, a starting point "A" and a finishing point "B". In embodiments where triggering system 202 employs a vector-based triggering scheme, the triggering system 202 triggers sensor 212 upon detecting sensor 212 located at point A, and triggers sensor 212 upon detecting sensor 212 located at point B. The total distance and path that sensor 212 travels between points A and B are irrelevant in a vector-based approach, which is only concerned about the presence of sensor 212 at point A first, and point b second. In some embodiments, the trigger at point A may be to have sensor 212 commence sampling, and the trigger at point B may be to have sensor 212 stop sampling. Such an approach is useful where sensor 212 may follow along a shape of the object to be tested, which may be irregular (and possibly double back past point A). In other embodiments, the triggers at points A and B may only be to take a single reading at each point, such as where points A and B define two critical points for measurement. The sensor 212 may need to take a circuitous route between points A and B, depending upon the shape of the object being tested. Such an approach may be useful when an edge or feature of an object that can be defined by a start and end point is to be measured; sensor 212 can be triggered to commence repeated sampling at point A, and discontinue at point B, effectively capturing measurements of the entire edge or feature.

An alternative approach, path-based triggering, considers the actual distance sensor 212 travels between a point A and a point B. In such embodiments, the location of the starting point A is the critical aspect, with the total linear distance traversed by sensor 212 being tracked. Thus, a sensor 212 taking a curved path to a point B will traverse a greater distance than a straight line path. Path-based triggering is effectively distance-based triggering, with a trigger initiated at some starting point A, then triggered again after a distance is traversed. Thus, in embodiments that employ path-based triggering, a point B need not be defined, but rather simply a point A followed by some distance. Such an approach may be defined by measurements made at routine distance intervals, e.g. trigger a measurement every millimeter, etc.

The triggering system 202 may transmit triggers to cause the sensors 212 to trigger all the sensors 212 at the same time (such as were sensors 212 are deployed in parallel) or may transmit one or more triggers to trigger a portion of the sensors 212 (such as where a subset of sensors 212 are in parallel, or a subset are deployed in sequence). Further, the triggering system 202 may transmit multiple triggers at a certain time or in a certain order to cause multiple of the sensors to operate cooperatively to capture data. For example, the triggering system 202 may transmit a trigger to a light sensor to illuminate the part and subsequently trigger a camera device to capture an image of the illuminated part.

In some embodiments, the triggering system 202 may provide multiple triggers to a sensor 212, where the triggers to indicate times when the sensor 212 is to start collecting data and times when the sensor 212 is to stop collecting data. For example, the triggering system 202 may provide a first trigger to a sensor 212 to cause the sensor 212 to start collecting data and a second trigger to the sensor 212 to cause the sensor 212 to stop collecting data. For example, the sensor 212 may be configured to capture data over a period of time. In response to receiving the first trigger, the sensor 212 may start collecting sensor data. The sensor 212 may continue collecting sensor data until the second trigger is received from the triggering system 202.

Further, the triggering system 202 may include an address of an output channel with one or more of the triggers transmitted to the sensors 212. For example, each channel from the triggering system 202 to one or of the sensors 212 may be assigned an address. When generating the triggers, the triggering system 202 may include the address of the channel corresponding to the sensor 212 to which the trigger is directed with the trigger. In some of these embodiments, the system 200 may include a multiplexer located between one or more of the sensors 212 and the triggering system 202, where the multiplexer may direct to the trigger to correct sensor 212 based on the address included with the trigger.

In some embodiments, the triggering system 202 may provide triggers based on occurrence of an event. For example, the triggering system 202 may provide triggers upon receiving an input (such as from the supervisory device 204 or an external device), certain encoder data received from the encoders 210 (which may indicate a position of the sensors 212), an indication of completion of collection of sensor data by one or more of the sensors 212, or some combination thereof. Further, the triggering system 202 may delay providing the triggers from the occurrence of the event in some embodiments. For example, the triggering system 202 may delay transmission of a trigger by a certain amount of time after the occurrence of the event.

The triggering system 202 may further compensate for delays that may occur in triggering of the sensors 212. For example, one or more of the sensors 212 may present a delay between the time that the trigger is transmitted by the triggering system 202 and the time that the sensors 212 capture sensor data. The triggering system 202 may determine the delay for each of the sensors 212 and schedule the timing of the triggers to compensate for the delay. For example, the triggering system 202 may perform an initialization procedure where the triggering system 202 determines an amount of delay between the time that a trigger is transmitted by the triggering system 202 and a time that sensor data is captured by each of the sensors 212. The triggering system 202 may then compensate for the delays of each of the sensors 212 by transmitting triggers for each of the sensors 212 at the corresponding delay time before the intended capture time of each of the sensors 212. Further, when a sensor 212 is intended to be triggered at a certain position and the motors 208 that move the sensor 212 are actuated at a speed, the triggering system 202 may determine the time at which the sensor 212 will be located at the certain position and may provide the trigger to the sensor 212 at an amount of time prior to the time that the sensor 122 will be located at the certain position, the amount of time equal to the amount of deal.

In some embodiments, the triggering system 202 may further generate a queue of triggers, where the queue of triggers includes multiple triggers to be provided by the triggering system 202. The triggers within the queue of triggers may each be associated with a certain index value. The triggers within the queue of triggers may be provided sequentially or in parallel. In some embodiments, the queue of triggers may further indicate which of the triggers within the queue are to be provided sequentially and which of the triggers within the queue are to be provided in parallel. Further, the queue of triggers may indicate positions that one or more sensors 212 are to be located at when each of the triggers is to be provided or when data is to be captured by the sensors 212. The triggering system 202 may provide the triggers according to the when the one or more sensors 212 are to be in the location indicated by the queue of triggers.

In some embodiments, the triggering system 202 may further provide the triggers based on a distance of travel of one or more of the sensors 212 or upon a predefined travel path of one or more sensors 212. For example, the triggering system 202 may transmit one or more triggers each time the sensors 212 travel a certain distance or may transmit one or more triggers at certain positions along the predefined travel path of the sensors 212. The predefined travel path may be defined by G-code, coordinate measuring machine language, coordinate sets, or some combination thereof.

In some embodiments, the triggering system 202 may enable and/or disable one or more of the triggers based on other triggers. For example, the triggering system 202 may not provide a certain trigger until a condition for providing another trigger has occurred. An example of such an embodiment may include the triggering system 202 not providing triggers within a queue of triggers until a time associated with another trigger has occurred.

As discussed above with respect to FIG. 1, the triggering system 202 may further compensate for the delay time in capturing encoder data from the encoders 210. For example, the triggering system 202 may capture encoder data from the encoders 210 when the sensors 212 capture sensor data rather than when the triggers are transmitted for the triggering system 202. In particular, the triggering system 202 may transmit a trigger to one of the sensors 212 then wait the corresponding delay time for the sensor 212 before capturing the encoder data from the encoders 210. Accordingly, the triggering system 202 may verify or determine the position of the sensor 212 when sensor data was captured by the sensor 212. This approach may provide greater accuracy than legacy approaches that relied on estimating the position of the sensor 212 at capturing or failed to compensate in delay time between transmission of the trigger and capture of sensor data by the sensor 212.

In some embodiments where positions of one or more of the sensors 212 continue to be translated during capturing of sensor data by the sensors 212, a position of the sensors 212 when capturing of the sensor data starts may be different than a position of the sensors 212 when the capturing of the sensor data completes. The triggering system 202 may determine the position at which the capturing of the sensor data starts and the position at which the capturing of the sensor data completes. For example, the triggering system 202 may determine the delay time from the trigger of the device to the start of the capturing of the sensor data during the initialization procedure. The triggering system 202 may transmit the trigger and then capture encoder data from the encoders 210 at the delay time after transmission of the trigger, where the encoder data from the encoders 210 indicates the position of the sensors 212 when capturing of the sensor data by the sensors 212 starts. The triggering system 202 may receive an indication from the sensors 212 that indicates when the sensors 212 have completed capturing of the sensor data. In response to receiving the indication that the sensors 212 have completed capturing of the sensor data, the triggering system 202 may capture encoder data from the encoders 210 at a subsequent time, where the subsequently captured encoder data indicates the position of the sensors 212 when capturing of the sensor data by the sensors 212 completes. The triggering system 202 may interpolate from the position of the sensors 212 at starting of the capturing of sensor data and the position of the sensors 212 at completion of the capturing of sensor data to determine an actual position of the sensors 212 represented by the sensor data captured by the sensors 212.

In some embodiments, the triggering system 202 and one or more of the sensors 212 may store data captured by the sensors 212 and/or received from the encoders 210. For example, the triggering system 202 may store encoder data 214 and the sensor 212e may store sensor data 216 captured by the sensor 212e in the illustrated embodiment. Both the triggering system 202 and the sensor 212e may provide the encoder data 214 and the sensor data 216, respectively, to the supervisory device 204 for analysis. The encoder data 214 and the sensor data 216 may need to be synchronized for proper evaluation by the supervisory device 204.

The triggering system 202 may generate virtual encoders for synchronizing the encoder data 214 and the sensor data 216. In particular, the triggering system 202 may generate the virtual encoders and transmit the virtual encoders to various sensors, such as the sensor 212e (which may be a laser sensor or other suitable sensor), where the triggering system 202 and the sensor 212e (or other suitable sensor) each associate corresponding encoder data 214 and sensor data 216 with the same virtual encoder. For example, triggering system 202 may continually or periodically read multiple encoder values for sensor 212e, and supply sensor 212e with a single value on a periodic basis, such as corresponding to the frequency with which the encoder values are read. When a trigger is sent to sensor 212e, it may return both the measured value as well as a single corresponding virtual encoder value. Triggering system 202 may then use the returned virtual encoder value to reference the actual values from multiple encoders.

Other examples that may use such an approach include embodiments where a sensor 212e employs buffering or some form of autonomous measurement, e.g. a "smart" sensor, as opposed to a "dumb" sensor, that simply measures when triggered. A so-called smart sensor may employ buffering to allow rapid capturing of multiple measurements, and may further receive high-level commands, such as a start and end point (either time-based or location-based, in some examples) as well as sample rate. The smart sensor 212e thus autonomously begins sampling at the designated rate at the start point, and stops at the end point. Sensor 212e may be capable of sampling at a rate faster than can be read out by triggering system 202 (or another module or device, depending upon the embodiment), and so may be required to buffer or otherwise store the measurements. To ensure locations are correctly captured, the buffered measurements may be associated with a virtual encoder value supplied by the triggering system 202. Thus, the triggering system 202 can subsequently use the virtual encoder value to obtain the actual encoder values corresponding to the position of each measurement.

The virtual encoders may be based on data received from the encoders 210, time, an index value in a trigger queue, an index value in a capture queue, a value from the supervisory device 204 or an external source, or some combination thereof. A virtual encoder may be employed to simplify management of multiple physical encoders. For example a virtual encoder may simply provide a routine or periodic increment, which can then act as an index or key into a lookup table or other data structure that stores captured encoder data 214 from each associated encoder 210. Thus, a single virtual encoder value maybe used to reference/retrieve the values from multiple encoders 210 that each may be associated with a specific dimension. The virtual encoder thus acts as a single value that can be used to determine the position of an associated sensor 212 in a 3D space. Virtual encoders may alternatively be generated by virtual trigger generator, which may be a part of triggering system 202.

In embodiments, a virtual encoder may be used to synchronize between multiple control units, such as multiple trigger management devices 202. For example, a single virtual encoder can provide a key into encoder data 214 from multiple encoders 210, each associated with a separate sensor 212. This data may thus be used to generate simultaneous triggers for each of the separate sensors 212 covered by the virtual encoder. The virtual encoder may be used to hide timing differences between each separate sensor 212 (such as by employing a per-sensor offset to add to values from each separate encoder 210), so that a single trigger coordinated to the virtual encoder will result in multiple actual triggers being correctly coordinated and transmitted to each separate sensor 212. In other embodiments, a virtual encoder may be used to synchronize between multiple sensors 212 controlled by a single triggering system 202. For example, where each sensor 212 has multiple encoders, or where a set of one or more encoders is associated with multiple sensors 212, the virtual encoder value can be associated with each of the multiple sensors 212, and thus allow referencing the actual encoder values associated with each of the multiple sensors 212.

For example of an embodiment where the encoder data 214 and the sensor data 216 are synchronized by virtual encoders, the triggering system 202 may transmit a trigger and a virtual encoder value to the sensor 212e. The trigger and the virtual encoder value may be transmitted by the triggering system 202 at the same time, the virtual encoder value may be transmitted prior to the trigger, or the virtual encoder value may be transmitted within a delay time for the sensor 212e of the trigger. The sensor 212e may capture data in response to the trigger and associate the data with the virtual encoder value. After transmitting the trigger, the triggering system 202 may wait the delay time for the sensor 212e and capture encoder data from the encoders 210, where the encoder data captured from the encoders 210 indicates a position of the sensor 212e when the sensor data is captured by the sensor 212e. The triggering system 202 may associate the encoder data captured from the encoders 210 with the virtual encoder value previously provided to the sensor 212e. An example of how virtual encoders may be used is discussed below with reference to FIG. 4.

Figure 3:
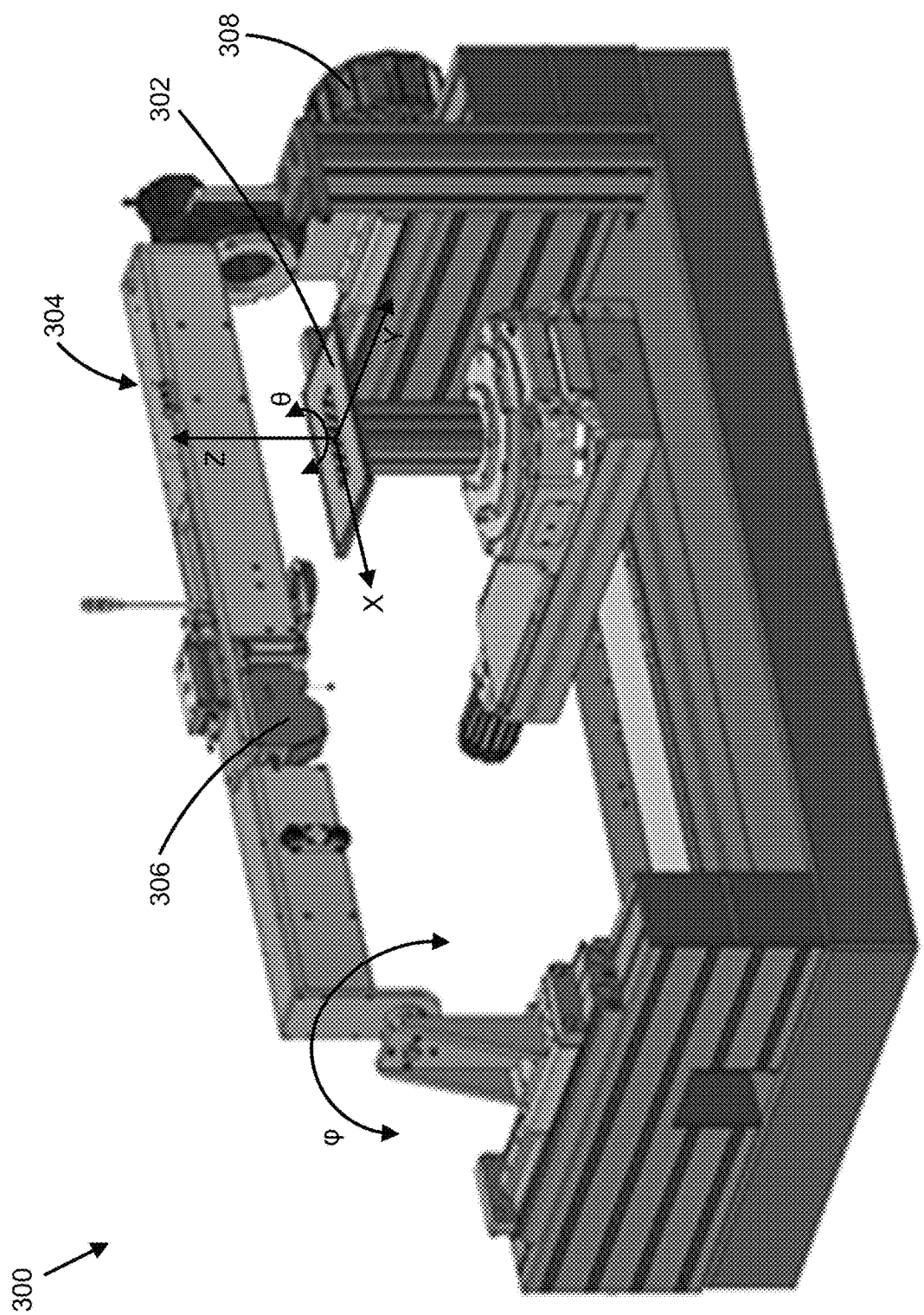
FIG. 3 illustrates an example measurement assembly, according to various embodiments.

FIG. 3 illustrates an example measurement assembly 300, according to various embodiments. The measurement assembly 300 may implement the trigger management device arrangement 100 (FIG. 1), the system 200 (FIG. 2), or some combination thereof. For example, the measurement assembly 300 may include and/or be coupled to a trigger management device (such as the trigger management device 108 (FIG. 1) and/or the triggering system 202 (FIG. 2)), a supervisory device (such as the supervisory device 106 (FIG. 1) and/or the supervisory device 204 (FIG. 2)), or some combination thereof.

The measurement assembly 300 may include one or more portions that may be translated by motors (such as the motors 208 (FIG. 2)). In particular, the measurement assembly 300 may include a platform 302 on which a part to be measured may be positioned. The platform 302 may be translated in one or more directions, rotated in one or more directions, or some combination thereof, via one or more motors (such as the motors 208). For example, the platform 302 may be translated in X, Y, and Z directions and rotated in a θ direction in the illustrated embodiment. The measurement assembly 300 may include four motors to translate the platform 302 in the illustrated embodiment, where each of the motors translate the platform 302 in one of the X, Y, Z, and θ directions. It is to be understood that the platform 302 may be translated and/or rotated in more or less directions in other embodiments.

The measurement assembly 300 may further include a metrology bridge 304. The metrology bridge may include one or more sensors (such as the sensors 104 (FIG. 1) and/or the sensors 212 (FIG. 2)). For example, the metrology bridge 304 includes a sensor 306 in the illustrated embodiment. The metrology bridge 304 may be rotated in an φ direction via one or more motors (such as the motors 208). For example, a motor 308 may rotate the metrology bridge in the φ direction in the illustrated embodiment.

Each of the motors in the measurement assembly 300 may be coupled to the supervisory device via one or more motion control devices (such as the motion control devices 206 (FIG. 2)). The supervisory device may provide one or more movement commands to the motion control devices. The motion control devices may actuate one or more of the motors based on the movement commands, where actuation of the motors may cause the platform 302 and/or the metrology bridge to be translated and/or rotated.

Further, each of the motors may be coupled to a respective encoder (such as the encoders 102 (FIG. 1) and/or the encoders 110 (FIG. 1)). For example, the measurement assembly 300 may include five encoders in the illustrated embodiment, where each of the encoders indicate positions of the corresponding motors that translate the platform 302 and/or the metrology bridge 304.

The trigger management device may be coupled to the encoders, the sensors, the supervisory device, or some combination thereof. The trigger management device may perform one or more of the operations described in relation to the trigger management device 108 and/or the triggering system 202 with respect to the encoders, the sensors, and/or the supervisory device. For example, the trigger management device may determine an amount of delay between the transmission of a trigger to the sensor 306 and capture of sensor data by the sensor 306. The trigger management device may further receive a triggering scheme from the supervisory device and generate one or more triggers for transmission to the sensor 306. Further, the trigger management device may transmit a trigger to the sensor 306 at a first time and cause the encoder associated with the motor 308 to capture encoder data at a second time, where the second time is the amount of delay after the first time. Based on the timing of the transmission of the trigger and capture of the encoder data, the sensor 306 may capture sensor data at approximately (within 1 microsecond) the same time as the encoder captures the encoder data.

While the illustrated embodiment is described with a single sensor 306, and translation and rotation of the platform 302 and the metrology bridge in the X, Y, Z, θ, and φ directions, it is to be understood that measurement assembly may include more sensors, may have more or less elements being translatable and/or rotatable, and/or may have more or less directions of translation and/or rotation in other embodiments. For example, the metrology bridge 304 may translatable in the Y and Z directions in other embodiments. Further, the metrology bridge 304 may include multiple sensors, and/or additional sensors may be located at other elements of the measurement assembly (such as at the platform 302) in other embodiments.

Figure 4:
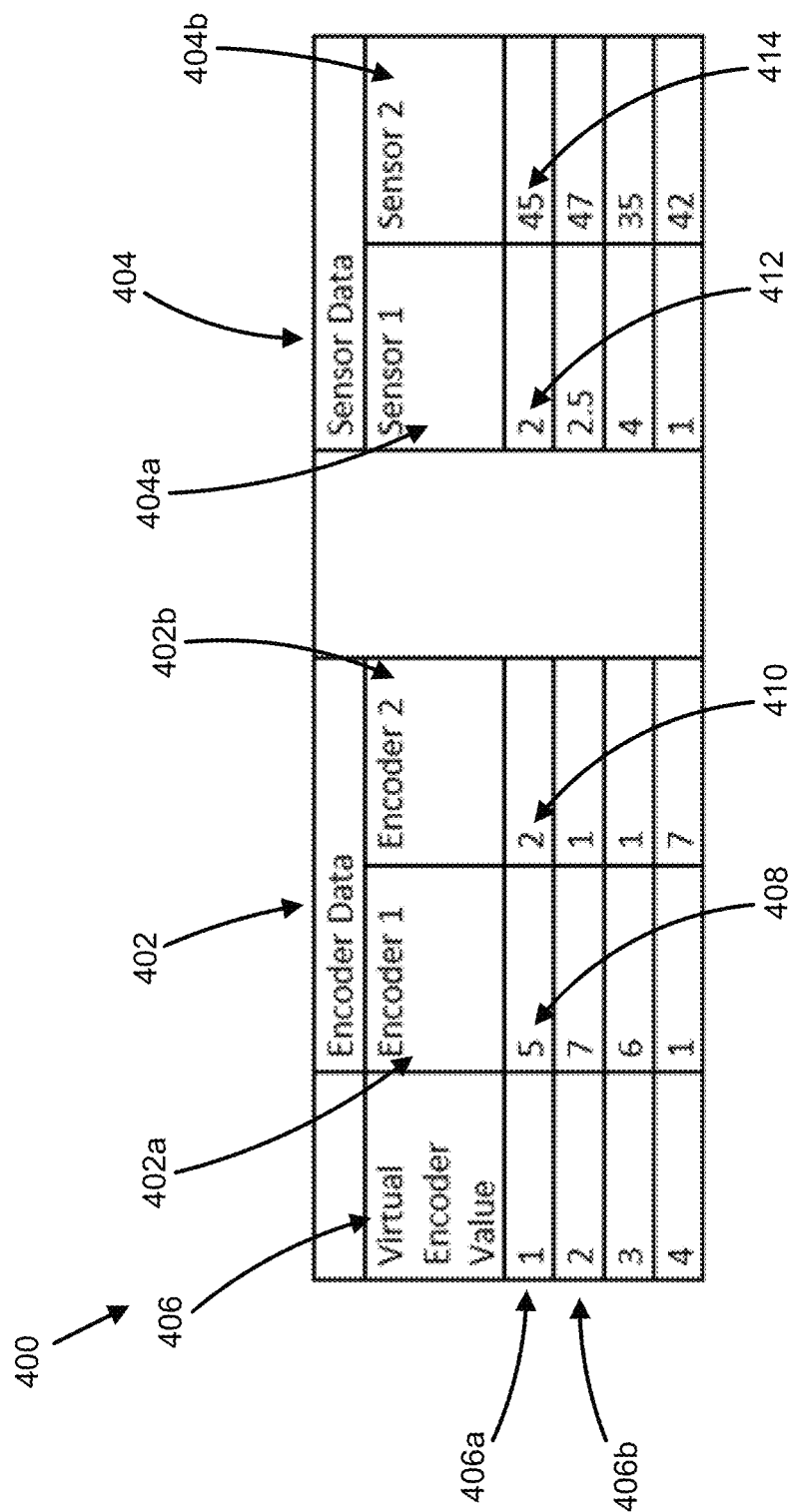
FIG. 4 illustrates a table of an example data arrangement, according to various embodiments.

FIG. 4 illustrates a table of an example data arrangement 400, according to various embodiments. In particular, the illustrated data arrangement 400 may be representative of a data arrangement produced in embodiments where a trigger management device (such as the trigger management device 108 (FIG. 1) and/or a triggering system 202 (FIG. 2)) implements virtual encoders.

The data arrangement 400 includes encoder data 402 and sensor data 404. The encoder data 402 may have been captured by one or more encoders (such as the encoders 102 (FIG. 1) and/or the encoders 210 (FIG. 2)). The encoder data 402 may be stored on the trigger management device and/or transmitted to a supervisory device (such as the supervisory device 106 (FIG. 1) and/or the supervisory device 204 (FIG. 2)) for storage and analysis. The sensor data 404 may have been captured by one or more sensors (such as the sensors 104 (FIG. 1) and/or the sensors 212 (FIG. 2)). The sensor data 404 may be stored on the sensors and/or transmitted to the supervisory device for storage and analysis. In the illustrated embodiment, the data arrangement may include first encoder data 402a that corresponds to a first encoder, second encoder data 402b that corresponds to a second encoder, first sensor data 404a that corresponds to a first sensor, and second sensor data 404b that corresponds to a second sensor.

The data arrangement 400 further includes a plurality of virtual encoder values 406. The virtual encoder values may have been generated by the trigger management device. Each of the virtual encoder values may correspond to a trigger that was transmitted by the trigger management device. For example, a first virtual encoder value 406a may correspond to a first trigger transmitted by the trigger management device to the sensors and a second virtual encoder value 406b may correspond to a second trigger transmitted by the trigger management device to the sensors.

Each of the virtual encoder values 406 may be associated with encoder data 402 and sensor data 404. For example, the first virtual encoder value 406a may be associated with a first encoder value 408 of the first encoder data 402a and a second encoder value 410 of the second encoder data 402b. Further, the first virtual encoder value 406a may be associated with a first sensor value 412 of the first sensor data 404a and a second sensor value 414 of the second sensor data 404b.

The first virtual encoder value 406a may have been associated with the with first sensor value 412 by the first sensor and with the second sensor value 414 by the second sensor. In particular, the first sensor may have associated the first sensor value 412 with the first virtual encoder value 406a based on the first sensor value 412 being captured in response to a trigger that corresponds to the first virtual encoder value 406a. The second sensor may have associated the second sensor value 414 with the first virtual encoder value 406a based on the second sensor value 414 being captured in response to the trigger that corresponds to the first virtual encoder value 406a. The trigger management device may have transmitted the first virtual encoder value 406a to the first sensor and the second sensor with the trigger for association with the first sensor value 412 and the second sensor value 414.

Further, the first virtual encoder value 406a may have been associated with the first encoder value 408 and the second encoder value 410 by the trigger management device. In particular, the trigger management device may have associated the first virtual encoder value 406a with the first encoder value 408 and the second encoder value 410 based on the first encoder value 408 and the second encoder value 410 being captured in response to the trigger that corresponds to the first virtual encoder 406a.

Figure 5:
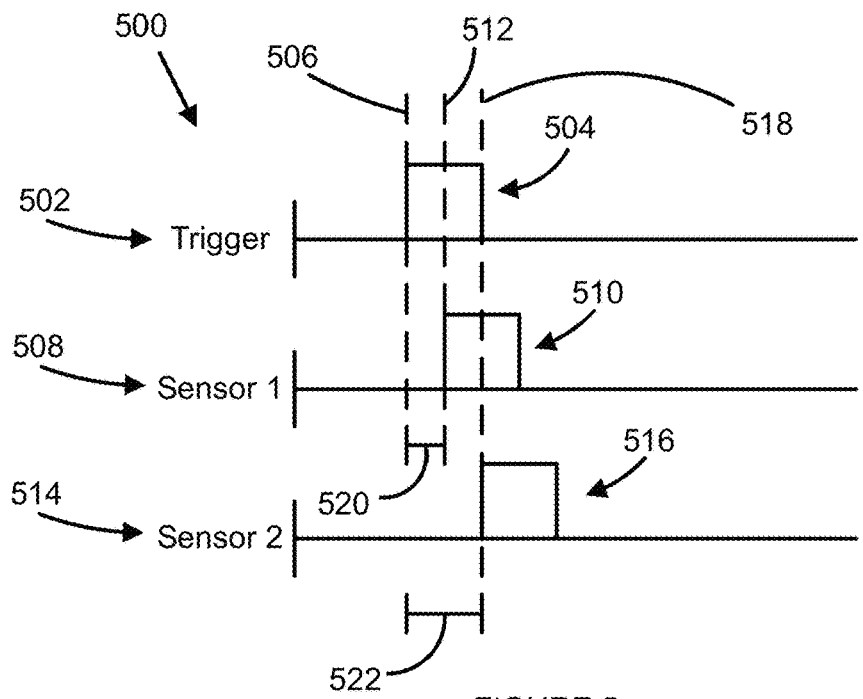
FIG. 5 illustrates an example timing chart for an initialization procedure of a trigger management device, according to various embodiments.

FIG. 5 illustrates an example timing chart 500 for an initialization procedure of a trigger management device, according to various embodiments. In particular, the trigger management device may perform the initialization procedure to determine an amount of delay for one or more sensors. The trigger management device may include one or more of the features of the trigger management device 108 (FIG. 1) and/or the triggering system 202 (FIG. 2). The initialization procedure illustrated by the timing chart 500 may be utilized by the trigger management device to determine an amount of delay from transmission of a trigger and a capture procedure for a first sensor and a second sensor.

The timing chart 500 illustrates a trigger signal 502. In particular, the trigger signal 502 illustrates a trigger 504. The trigger management device may have transmitted the trigger 504 to the first sensor and the second sensor. The trigger management device may have transmitted the trigger 504 at a first time 506, as illustrated by the positive edge of the trigger 504.

The trigger chart 500 further illustrates a first sensor signal 508. In particular, the first sensor signal 508 illustrates an indication 510 of an initiation of a capture procedure by a first sensor. In particular, the indication 510 may indicate the initiation of a capture procedure by the first sensor, the capture procedure being prompted by receipt of the trigger 504 by the first sensor. The trigger management device may have received the indication 510 at a second time 512, as illustrated by the positive edge of the indication 510.

The trigger chart 500 further illustrates a second sensor signal 514. In particular, the second sensor signal 514 illustrates an indication 516 of an initiation of a capture procedure by a second sensor. In particular, the indication 516 may indicate the initiation of a capture procedure by the second sensor, the capture procedure being prompted by receipt of the trigger 504 by the second sensor. The trigger management device may have received the indication 516 at a third time 518, as illustrated by the positive edge of the indication 516.

The trigger management device may determine an amount of delay of the first sensor from transmission of a trigger to initiation of a capture procedure based on the trigger signal 502 and the first sensor signal 508. In particular, the trigger management device may determine a time difference 520 between the first time 506, where the trigger 504 was transmitted, and the second time 512, where the indication 510 of the initiation of a capture procedure by the first sensor was received. The trigger management device may store the time difference 520 as the amount of delay between transmission of a trigger and initiation of a capture procedure for the first sensor. The trigger management device may take the amount of delay into account when determining when to transmit further triggers to the first sensor.

The trigger management device may further determine an amount of delay of the second sensor from transmission of a trigger to initiation of a capture procedure based on the trigger signal 502 and the second sensor signal 508. In particular, the trigger management device may determine a time difference 522 between the first time 506, where the trigger 504 was transmitted, and the third time 518, where the indication 516 of the initiation of a capture procedure by the second sensor was received. The trigger management device may store the time difference 522 as the amount of delay between transmission of a trigger and initiation of a capture procedure for the second sensor. The trigger management device may take the amount of delay into account when determining when to transmit further triggers to the second sensor.

Figure 6:
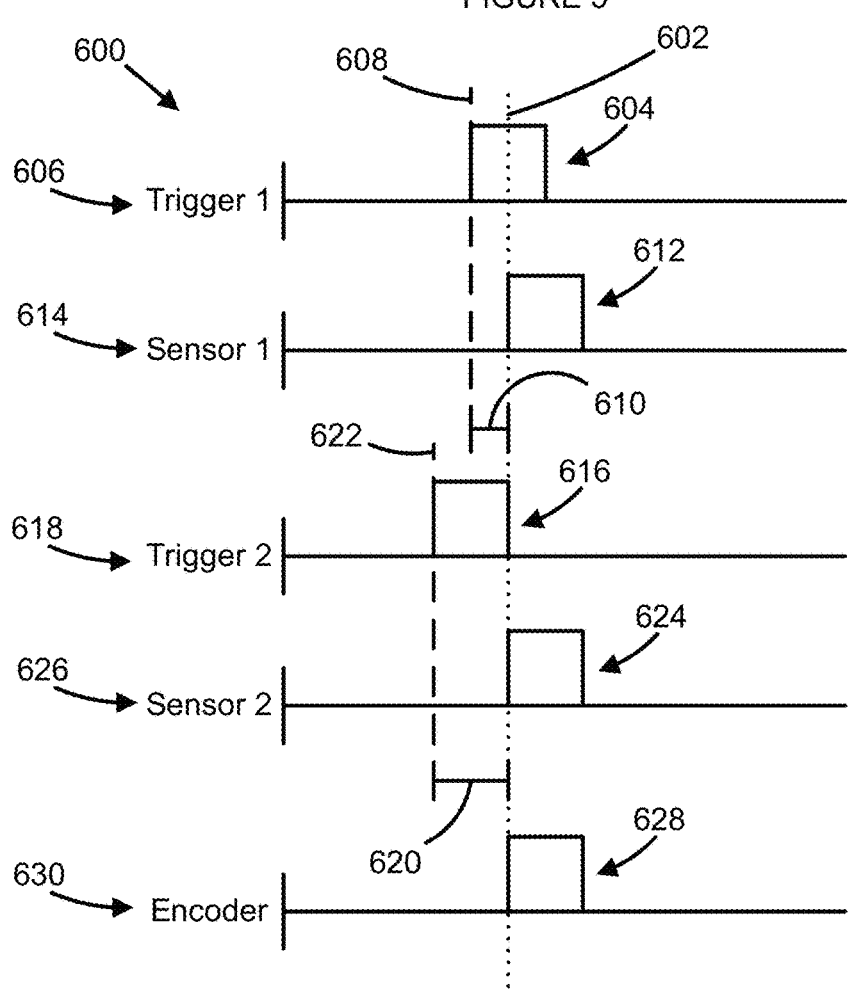
FIG. 6 illustrates an example timing chart illustrating transmitting of example triggers by the trigger management device, according to various embodiments.

FIG. 6 illustrates an example timing chart 600 illustrating transmitting of example triggers by the trigger management device, according to various embodiments. In particular, the timing chart 600 may illustrate transmission of triggers by the trigger management where the amount of delay is taken into account.

In the illustrated embodiment, the trigger management device may have determined that sensor data should be captured at a first time 602, illustrated by the dotted line. The trigger management device may take into account the amount of delay of the first sensor and the second sensor when determining when to transmit the triggers to the first sensor and the sensor.

In particular, the trigger management device may transmit a first trigger 604, as represented by the first trigger signal 606, to the first sensor. The trigger management device may determine that the first trigger 604 is to be transmitted to the first sensor at the amount of delay 610 prior to the first time 602 in order to have the first sensor capture sensor data at the first time 602. Accordingly, the trigger management device may determine that the first trigger 604 is to be transmitted at a second time 608, where the second time 608 is the amount of delay 610 prior to the first time 602. In the illustrated embodiment, the amount of delay 610 may be equal to the time difference 520 (FIG. 5) determined to be the amount of delay for the first sensor in accordance with the timing chart 500 (FIG. 5). The first sensor may initiate a capture procedure at the first time 602, as illustrated by an indication 612 of initiation of a capture procedure on a first sensor signal 614.

The trigger management device may further transmit a second trigger 616, as represented by the second trigger signal 618, to the second sensor. The trigger management device may determine that the second trigger 616 is to be transmitted to the second sensor at the amount of delay 620 prior to the first time 602 in order to have the second sensor capture sensor data at the first time 602. Accordingly, the trigger management device may determine that the second trigger 616 is to be transmitted at a third time 622, where the third time 622 is the amount of delay 620 prior to the first time 602. In the illustrated embodiment, the amount of delay 620 may be equal to the time difference 522 (FIG. 5) determined to be the amount of delay for the second sensor in accordance with the timing chart 500 (FIG. 5). The second sensor may initiate a capture procedure at the first time 602, as illustrated by an indication 624 of initiation of a capture procedure on a second sensor signal 626.

The trigger management device may further capture encoder data at the first time 602, as illustrated by an indication 628 of initiation of a capture procedure on an encoder signal 630. In particular, the trigger management device may capture encoder data of one or more encoders (such as the encoders 102 (FIG. 1) and/or the encoders 210 (FIG. 2)) at the first time 602. The trigger management device may capture the encoder data and utilize the encoder data to determine the positions of the first sensor and the second sensor at the time that the first sensor and the second sensor capture sensor data.

Figure 7:
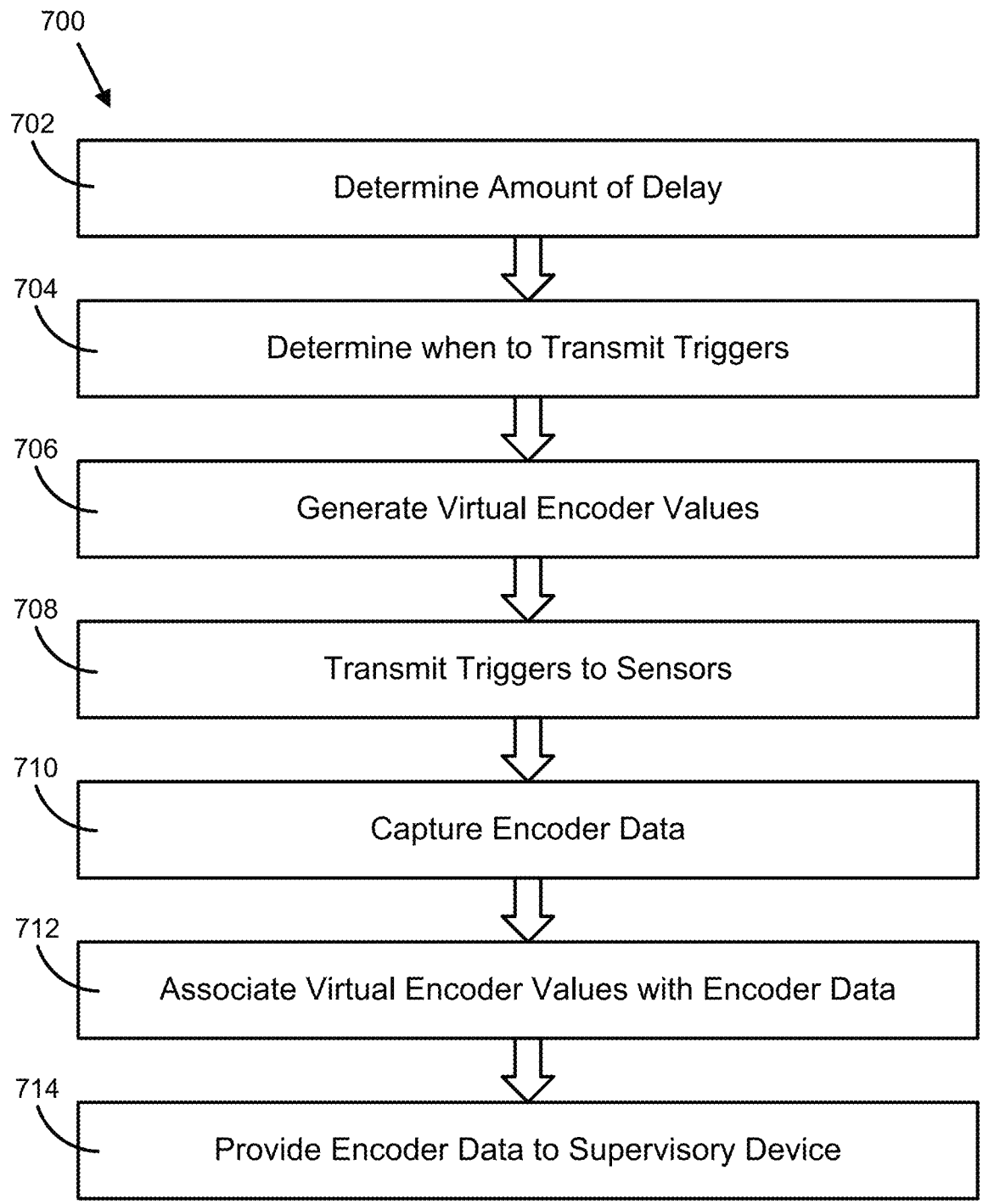
FIG. 7 illustrates an example procedure to be performed by a trigger management device, according to various embodiments.

FIG. 7 illustrates an example procedure 700 to be performed by a trigger management device, according to various embodiments. In particular, the procedure 700 may be performed by the trigger management device 108 (FIG. 1) and/or the triggering system 202 (FIG. 2).

In stage 702, the trigger management device may determine an amount of delay for one or more sensors coupled to the trigger management device. For example, the trigger management device may perform an initialization procedure (such as the initialization procedure described in relation to FIG. 5) to determine the amount of delay for the sensors. Stage 702 may be performed on startup or power on of the trigger management device, in response to interchange of one or more of the sensors, and/or in response to determining that amounts of delays of the sensors have been corrupted or are no longer stored.

In stage 704, the trigger management device may determine when to transmit one or more triggers to one or more sensors (such as the sensors 104 (FIG. 1), the sensors 212 (FIG. 2), and/or the sensor 306 (FIG. 3). The trigger management device may receive a triggering scheme from a supervisory device (such as the supervisory device 106 (FIG. 1) and/or the supervisory device 204 (FIG. 2)) and may generate one or more triggers based on the triggering scheme. Further, the trigger management device may determine a time that the sensors are to capture data based on the triggering scheme. The trigger management device may further take the amount of delay for each of the sensors into account when determining when to transmit the triggers.

In stage 706, the trigger management device may generate one or more virtual encoder values. For example, the trigger management device may generate a virtual encoder value for each of the triggers to be transmitted by the trigger management device. In embodiments where the trigger management device does not implement virtual encoders, stage 706 may be omitted.

In stage 708, the trigger management device may transmit the triggers to the sensors. In particular, the trigger management device may transmit the triggers at the times determined in stage 704. In embodiments where the trigger management device implements virtual triggers, the trigger management device may further include the virtual encoder values with the corresponding triggers for the sensors to associate the captured sensor data with the corresponding virtual encoder values.

In stage 710, the trigger management device may capture encoder data from encoders (such as the encoders 102 (FIG. 1) and/or the encoders 210 (FIG. 2)). In particular, the trigger management device may capture encoder data at times corresponding to each of the triggers transmitted by the trigger management device. For example, the trigger management device may perform a capture procedure at certain times after each trigger, where the certain times are equal to the amount of delay for the sensor to which the trigger is transmitted.

In stage 712, the trigger management device may associate the virtual encoder values with the captured encoder data. In particular, the trigger management device may associate encoder data captured in response to a trigger with a virtual encoder value that corresponds to the trigger. In embodiments where the trigger management device does not implement virtual encoders, stage 712 may be omitted.

In stage 714, the trigger management device may provide the captured encoder data to the supervisory device. The trigger management device may provide the captured encoder data to the supervisory device upon completion of capturing the encoder data, at set temporal intervals, in response to a request from the supervisory device, or some combination thereof. In embodiments where the trigger management device implements virtual encoders, the trigger management device may transmit the captured encoder data with the associated virtual encoder values. In still other embodiments, trigger management device may provide the captured encoder data, possibly along with other data, to multiple devices, such as multiple supervisory devices and/or other modules for further processing.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. A trigger management device to be implemented in a measurement assembly, the trigger management device comprising:
    trigger circuitry coupled to a sensor of the measurement assembly, the trigger circuitry configured to
    transmit a trigger to the sensor at a first time, the trigger to cause the sensor to capture sensor data; and
    encoder circuitry coupled to one or more encoders of the measurement assembly, the one or more encoders to indicate current positions of one or more motors of the measurement assembly that cause the sensor to be translated, the encoder circuitry to capture encoder data from the one or more encoders at a second time after the first time, the second time corresponding to an amount of time between transmission of the trigger and the capture of the sensor data by the sensor, wherein the encoder data indicates current positions of the one or more motors at the time the sensor data is captured, the encoder data corresponding to a location of a plurality of locations on an object where the sensor captured the sensor data.

2. The trigger management device of claim 1, wherein: the encoder circuitry is further to:
generate a virtual encoder value associated with the trigger; and
associate the virtual encoder value with the encoder data captured from the one or more encoders; and
the trigger circuitry is further to transmit the virtual encoder value to the sensor, wherein the sensor is to associate the virtual encoder value with the sensor data captured by the sensor.

3. The trigger management device of claim 1, wherein the encoder circuitry is further to:
identify an indication of completion of capturing of the sensor data from the sensor; and
capture encoder data from the one or more encoders in response to identification of the indication.

4. The trigger management device of claim 1, wherein the trigger circuitry is further coupled to a supervisory device of the measurement assembly, and wherein the trigger circuitry is further to:
identify a triggering scheme received from the supervisory device; and
determine a transmission time for transmission of the trigger based on the triggering scheme, wherein the trigger is transmitted at the transmission time.

5. The trigger management device of claim 1, wherein the sensor is a first sensor, wherein the predetermined time is a first predetermined time, wherein the trigger is a first trigger, the sensor data is first sensor data, the encoder data is first encoder data, wherein the trigger circuitry is further coupled to a second sensor of the measurement assembly, and wherein:
the trigger circuitry is further to:
transmit a second trigger to the second sensor, the second trigger to cause the second sensor to capture second sensor data; and
the encoder circuitry is further to capture second encoder data from the one or more encoders at a second predetermined time corresponding to an amount of time between transmission of the second trigger and capture of the second sensor data by the second sensor, wherein the second encoder data indicates current positions of the one or more motors at the second time.

6. A method of measurement data capture management, comprising:
transmitting, by the trigger management device, a trigger to the sensor secured to a measurement assembly at a first time, the trigger to cause the sensor to capture sensor data;
capturing, by the trigger management device, encoder data from a plurality of encoders at a second time later than the first time, wherein the second time corresponds to an amount of time between transmission of the trigger and capture of the sensor data by the sensor, wherein the encoder data indicates a position of the measurement assembly in a plurality of dimensions at the second time; and
computing, from the encoder data, a position on an object being measured by the sensor at the time of capture of the sensor data, the position on the object corresponding to a location of a plurality of locations on the object where the sensor captured the sensor data.

7. The method of claim 6, further comprising performing an initialization procedure to determine the amount of time.

8. The method of claim 6, further comprising:
generating, by the trigger management device, a virtual encoder value;
transmitting, by the trigger management device, the virtual encoder value to the sensor, the virtual encoder value to be associated with the sensor data by the sensor; and
associating, by the trigger management device, the virtual encoder value with the encoder data.

9. The method of claim 8, wherein the encoder data is first encoder data, further comprising:
identifying, by the trigger management device, an indication of completion of capture of the sensor data received from the sensor;
capturing, by the trigger management device, second encoder data from the plurality of encoders in response to identification of the indication of completion of capture of the sensor data; and
associating, by the trigger management device, the virtual encoder value with the second encoder data.

10. The method of claim 6, further comprising:
identifying, by the trigger management device, a triggering scheme received from a supervisory device of the measurement assembly; and
determining, by the trigger management device, when to transmit the trigger based on the triggering scheme.

11. A measurement assembly for measuring an object, comprising:
an actuator to translate a portion of the measurement assembly;
an encoder coupled to the actuator, the encoder to indicate a current position of the actuator;
a sensor coupled to the portion of the measurement assembly, the sensor to capture sensor data in response to a trigger;
a trigger management device coupled to the encoder and the sensor, the trigger management device configured to:
transmit the trigger to the sensor at a first time; and
capture encoder data from the encoder at a second time, the second time later than the first time, the second time corresponding to an amount of time between transmission of the trigger and capture of the sensor data by the sensor, wherein the encoder data indicates a position of the actuator at the second time, the position of the actuator corresponding to a position from a plurality of positions on the object sensed by the sensor.

12. The measurement assembly of claim 11, wherein the trigger management device is further to:
set a timer equal to the amount of time between transmission of the trigger and capture of the sensor data by the sensor;
initiate countdown of the timer upon transmission of the trigger, wherein the encoder data is captured at expiration of the timer.

13. The measurement assembly of claim 11, wherein the measurement assembly further comprises a supervisory device coupled to the trigger management device, wherein the supervisory device is to transmit a triggering scheme to the trigger management device, and wherein the trigger management device is to determine the first time for transmission of the trigger based on the triggering scheme.

14. The measurement assembly of claim 13, wherein the triggering scheme indicates a time at which the sensor is to capture the sensor data, and wherein to determine the first time includes to set the first time relative to the time at which the sensor is to capture the sensor data indicated by the triggering scheme.

15. The measurement assembly of claim 13, wherein the triggering scheme indicates an actuator position at which the sensor is to capture the sensor data and a speed at which the actuator is being actuated, wherein the trigger management device is to determine a predicted time at which the actuator is predicted to be at the actuator position based on the speed at which the actuator is being actuated, and wherein to determine the first time includes to set the first time so that the sensor captures the sensor data at the predicted time.

16. The measurement assembly of claim 11, wherein:
the trigger management device is further to:
generate a virtual encoder value;
associate the virtual encoder value with the captured encoder data; and
transmit the virtual encoder value to the sensor; and
the sensor is further to associate the virtual encoder value with the captured sensor data.

17. The measurement assembly of claim 16, further comprising a supervisory device coupled to the trigger management device and the sensor, wherein the trigger management device is further to transmit the captured encoder data with the associated virtual encoder value to the supervisory device, wherein the sensor is to transmit the captured sensor data with the associated virtual encoder value to the supervisory device, and wherein the supervisory device is to determine that the captured encoder data and the captured sensor data relate to the trigger based on the virtual encoder value.

18. The measurement assembly of claim 16, wherein:
the encoder data is first encoder data;
the sensor is further to transmit an indication of completion of capture of the sensor data to the trigger management device upon completion of capturing the sensor data; and
the trigger management device is further configured to:
capture second encoder data in response to receipt of the indication of completion of the sensor data; and
associate the virtual encoder value with the second encoder data.

19. The measurement assembly of claim 11, further comprising a supervisory device coupled to the trigger management device and the actuator, wherein the trigger management device is further to transmit the encoder data to the supervisory device, and wherein the supervisory device is configured to:
compare the received encoder data with expected encoder data; and
update actuation of the actuator based on the received encoder data and the expected encoder data being different.

20. The measurement assembly of claim 11, wherein the actuator is a motor, the sensor is a first sensor, the trigger is a first trigger, the sensor data is a first sensor data, the delay time is a first delay time, wherein the measurement assembly includes a second sensor to capture second sensor data in response to a second trigger, and wherein the trigger management device is configured to:
transmit the second trigger to the second sensor at a third time corresponding to a time between transmission of the trigger and capture of the second sensor data by the second sensor, wherein transmission of the second trigger to the second sensor at the third time is to cause the second sensor and the first sensor to capture the first sensor data and the second sensor data at the second time.

* * * * *